United States Patent [19]
Gerringer

[11] Patent Number: 5,388,729
[45] Date of Patent: Feb. 14, 1995

[54] PITCHER WITH CADDY ATTACHMENT

[76] Inventor: Robert M. Gerringer, 1310 Chandler Ct., Acworth, Ga. 30102

[21] Appl. No.: 273,373

[22] Filed: Jul. 11, 1994

Related U.S. Application Data

[63] Continuation-in-part of Ser. No. 160,488, Dec. 1, 1993, abandoned.

[51] Int. Cl.6 .................. A47G 19/14; B67D 5/60
[52] U.S. Cl. ........................ 222/130; 215/6; 220/521; 222/465.1; 222/189
[58] Field of Search ............... 222/129, 130, 131, 143, 222/189, 192, 465.1, 548, 553–555; 215/6; 220/23.83, 212, 521

[56] References Cited

U.S. PATENT DOCUMENTS

| D. 229,012 | 11/1973 | Wooters | 222/465.1 X |
|---|---|---|---|
| 2,074,230 | 3/1937 | McMahon | 222/143 |
| 2,199,687 | 5/1940 | Blankenship | 222/129 |
| 2,766,796 | 10/1956 | Tupper | 215/6 X |
| 2,791,467 | 5/1957 | Leshin | 222/143 |
| 3,140,799 | 7/1964 | Mehr | 222/465.1 X |
| 3,225,915 | 12/1965 | Wise | 220/521 X |
| 3,998,351 | 12/1976 | Smith et al. | 222/143 X |
| 4,911,295 | 3/1990 | Venegoni | 220/23.83 X |
| 5,180,079 | 1/1993 | Jeng | 220/23.83 X |

Primary Examiner—Kevin P. Shaver
Attorney, Agent, or Firm—Kenneth S. Watkins, Jr.

[57] ABSTRACT

A pitcher with caddy attachment is disclosed which comprises a secondary vessel which fits into the top of the pitcher and stores garnishes, ice or other items. The secondary vessel includes a skirt with at least one opening which allows contents to be poured from the pitcher without removing the caddy from the pitcher. A retaining devise is used to retain the caddy in the pitcher and the lid of the caddy in the caddy when the pitcher is in a pouring position.

6 Claims, 2 Drawing Sheets

PITCHER WITH CADDY ATTACHMENT

This application is a continuation-in-part of original application Ser. No. 08/160,488, filed Dec. 1, 1993, now abandoned.

BACKGROUND

This invention relates to a pitcher for liquids with a secondary vessel or caddy attachment to contain garnishes or ice served with the drink.

Many drinks are served with accompanying garnishes or ice. For example, iced tea is often served with lemon or mint; punch may be served with fruit garnishes. Cold drinks may require additional ice which is housed currently in a separate serving dish.

Pitchers of drinks may become separated from their accompanying garnishes or ice. Guests may overlook garnishes provided for their drink. Or, guests may be required to search for the garnishes or ice they need because those items have become separated from the pitcher.

Additionally, transportation of drinks and garnishes require the hostess to handle two serving pieces. Carrying a pitcher of drinks and a tray of accompanying garnishes to the dining room, deck or other serving location requires the hostess to use both hands or employ a tray.

In addition, many trays and serving tables are small. A pitcher and a separate container for the garnishes nay take up space on small serving areas that is needed for other items.

The use of a pitcher with separate tray for garnishes or a separate container for ice needlessly complicates many serving tasks. It allows the garnishes or ice to become separated from the drinks they accompany. It requires transporting an additional serving piece. And it wastes precious space on small serving trays and tables.

A number of devices have been used in the past to contain two substances in one unit. One such vessel (U.S. Pat. No. 3,998,351 to Smith et al.) includes a small pitcher for liquid in the top portion of the larger pot or pitcher. The device would not work as a pitcher with garnish caddy because the small pitcher is not sized to optimally hold solid objects. It would be difficult to pour from the pitcher without first removing the small upper pitcher.

Cooking vessels have been devised which combine various cooking containers in a flexible manner to create new cooking devices. Again, these devices do not permit the upper vessel to fit tightly inside the lower vessel so the liquid contents of the lower vessel could pour while the upper vessel in in place. In fact, no means is provided from which to pour liquid from the lower vessel.

Design patent 229,012 to Wooters discloses a covered pitcher. No method is disclosed to store garnishes or retain the lid when the pitcher in is a pouring position.

U.S. Pat. No. 2,766,796 to Tupper discloses a lid for vessels containing a storage chamber. However, no method is disclosed to allow pouring of a liquid from the vessel with the lid in place.

The objective of the present invention is to provide a pitcher for liquids with a secondary container for storing condiments and other items.

A further object of the present invention is to allow liquid to be poured from the pitcher without removing the secondary vessel.

Yet another object of the present invention is to provide a secondary vessel which will remain in place when the pitcher is in a pouring position.

SUMMARY

My invention, a pitcher with a secondary vessel or caddy, simplifies many serving tasks. My pitcher/caddy keeps the garnishes together with the drinks they accompany. For example, the mint or lemon is easily accessible when pouring iced tea. Additionally housing the drinks and garnishes together makes transportation easier; carrying one serving piece requires less effort than carrying a separate pitcher and garnish tray. And, the pitcher/caddy device takes up less space on a serving tray or table than is required for two serving pieces.

The device comprises a pitcher with a spout in the upper portion of the wall. A secondary vessel comprising a secondary wall, a solid bottom, and a lid is used to store garnishes and other items. A skirt attached to the bottom of the secondary vessel fits tightly into the upper portion of the pitcher, providing a convenient and readily accessible compartment for storing garnishes and the like on the pitcher.

The skirt has at least one opening which can be rotateably aligned with the pouring spout of the pitcher. The secondary wall forms a surface which can be grasped by the hand to rotate the caddy so that the opening in the skirt is aligned with the spout when pouring liquid from the pitcher. In this way, the caddy does not have to be removed from the pitcher to pour from the pitcher. The outside surface of the secondary wall may be textured or covered with a non-slip covering to improve the grip and aid in rotating the caddy to align the desired pouring opening, or for removing the caddy.

Both the lid-caddy and caddy-pitcher fits are tight so that they remain in place when the pitcher is in a pouring position. The caddy and lid may be rotated or removed by nominal hand force. A partition can be added to the interior of the caddy to separate different items in the caddy.

BRIEF DESCRIPTION OF THE DRAWINGS

These and other features, aspects, and advantages of the present invention will become better understood with regard to the following description, appended claims, and accompanying drawings where:

DETAILED DESCRIPTION

"Tight fitting" or "fits tightly" is defined as snug enough to retain or prevent the component from falling out when the pitcher is used in the pouring position and yet sufficiently unrestricted to allow rotating or removing the component by nominal hand force.

Figure 1:
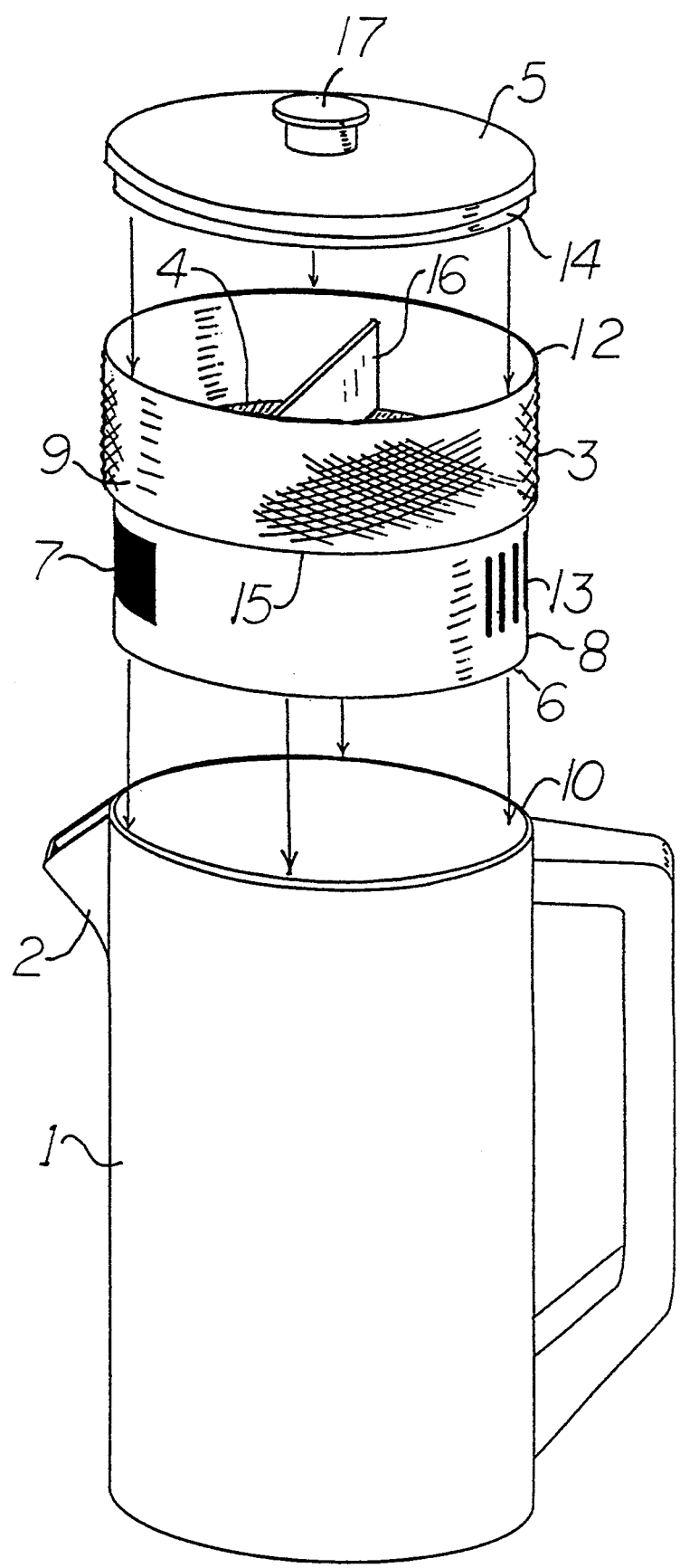
FIG. 1 is a perspective view of the present invention.

As shown in FIG. 1, a pitcher with caddy comprises a pitcher 1 and a recloseable secondary vessel or caddy 9 which fits tightly in the upper wall portion 10 of the pitcher. The recloseable lid 5 fits tightly in the top portion 12 of secondary vessel 9.

Pitcher 1 is made of plastic or similar material and is designed to contain liquids. The upper wall portion 10 of the pitcher in the preferred embodiment has a circular cross section. The upper portion includes a spout 2.

The overall size of pitcher 1 can vary depending on the type of liquid and the use for which it is intended.

The container section of caddy 9 is formed by a secondary wall 3 and a solid bottom 4. Caddy 9 includes an integral skirt 6 which extends downward from the secondary vessel and has a circular cross section of a size to permit a tight fit with the inside wall of upper pitcher portion 10. The skirt of the caddy includes at least one opening which is rotateably aligned with the spout to permit pouring of a liquid from the pitcher when the pitcher is in a pouring position. In its preferred embodiment, the skirt of the caddy includes two openings to permit liquid to pour from the pitcher; opening 7 permits unrestricted flow of liquid from the pitcher and opening 8, with a plurality of smaller openings 13, strains the liquid as it flows from the pitcher by retaining solids of dimensions larger than the small openings.

Secondary wall 3 forms a surface which is grasped by the hand to rotateably align the pouring holes 7 and 8 with spout 2 to pour liquids, or to seal the pitcher portion by rotating a solid skirt portion to the spout. In its preferred embodiment, the caddy is made of plastic or similar material and is designed to hold solids such as sugar, fruit slices, cherries, or ice. Secondary wall 3 may be formed with a surface texture or frictional covering to improve hand grip on the surface for rotating or removing the caddy. Symbols or lettering on the secondary wall may be added to indicate the location of the pouring openings 7 and 8.

Secondary vessel edge 15 engages the top rim of upper wall portion 10 of pitcher 1 to prevent caddy 9 from being inserted too far into the pitcher. Compartment divider 16 divides the interior of caddy 9 into two or more compartments for storage of several items.

In the preferred embodiment of the present invention, the lid lip 14 fits tightly inside the upper portion 12 of secondary wall 3 of caddy 9 to retain the lid, although it could be made to fit outside the secondary wall of the caddy. "Press-to-release" lid mechanisms, known in the art, may also be used in the lid. The lid is made of plastic or similar material and is designed to remain on the pitcher caddy when in a pouring position. Knob 17 may be used to grasp the lid for removal.

Figure 2:
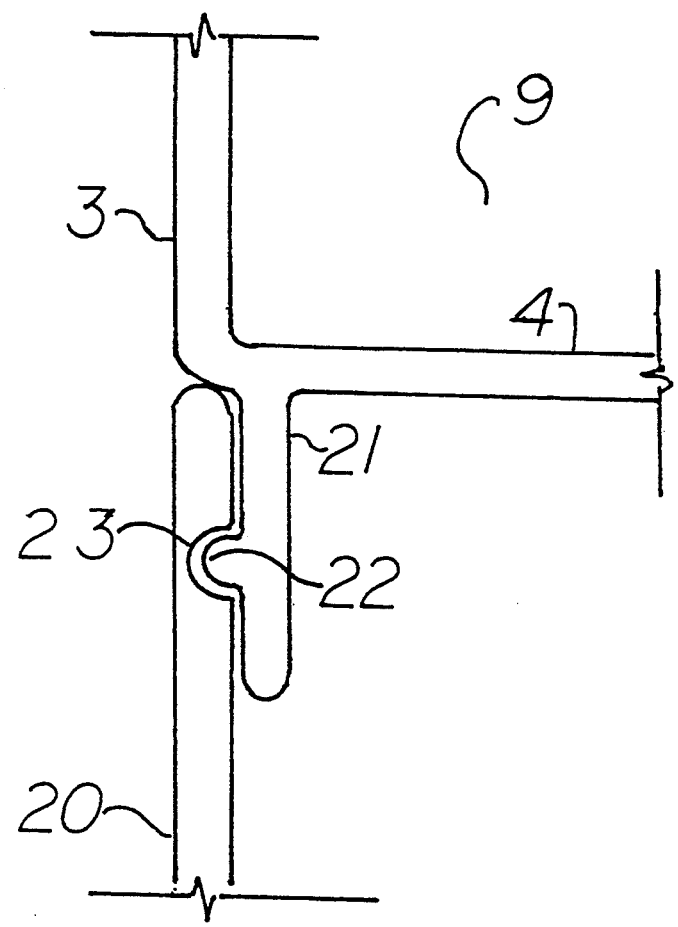
FIG. 2 is a detailed section of the skirt fitting inside the pitcher.

FIG. 2 is a detailed cross section of the skirt-pitcher fit in an alternative embodiment of the present invention. Skirt 21 and pitcher wall 20 comprise a retaining means such as a protruding ring 22 on skirt 21 which engages detent ring 23 on pitcher wall 20. The retaining means retains the skirt and hence the caddy in the pitcher when the pitcher is in the pouring position. Caddy 9 can be rotated, removed, or re-inserted in the pitcher with nominal hand force by gripping secondary wall 3.

Although the the cross section of the pitcher and caddy is circular, an alternative embodiment of the present invention comprises a polygonal shape cross section. In this embodiment, the caddy must be removed from the pitcher in order to rotate and reinsert the caddy to achieve a different pouring configuration.

Accordingly the reader will see the the Pitcher With Caddy Attachment provides a pitcher with an integral storage caddy for condiments and the like. The device comprises the following additional advantages:

liquid may be poured without removing or holding the caddy or lid, full pouring, straining, or closure of the pitcher can be selected by rotating the caddy, several different substances may be stored in the caddy simultaneously, and it is simple and can be manufactured at low cost.

Although the description above contains many specifications, these should not be construed as limiting the scope of the invention but as merely providing illustrations of some of the presently preferred embodiments of this invention. For example, an "O" ring seal may be employed between the caddy and pitcher or caddy and lid, etc.

Thus the scope of the invention should be determined by the appended claims and their legal equivalents, rather than by the examples given.

I claim:

1. A pitcher with caddy attachment for storing condiments, the device comprising:
   (a) a pitcher comprising an upper wall portion and a spout disposed in the upper wall portion;
   (b) a recloseable secondary vessel having at least one chamber formed by a secondary wall, a solid bottom, and a recloseable lid;
   (c) a skirt, integral with the secondary vessel, extending downward from the secondary vessel and being inside the pitcher wall portion and having at least one opening which can be aligned rotateably with the spout of the pitcher,
   (d) a rotating means comprising the secondary wall for grasping and rotating the secondary vessel, whereby a convenient surface is available to rotateably align the skirt.

2. A device as in claim 1 additionally comprising a retaining means for the recloseable lid for retaining the lid in the secondary vessel when the pitcher is in a pouring position; and a second retaining means for retaining the secondary vessel in the pitcher when the pitcher is in a pouring position.

3. A device as in claim 2 wherein:
   the retaining means comprises a tight fit between the recloseable lid and the secondary wall; and
   the second retaining means comprises a tight fit between the skirt and the upper pitcher portion.

4. A device as in claim 1 further comprising a second opening on the skirt which is comprised of a plurality of small openings which function to retain solids of dimensions larger than the small openings.

5. A device as in claim 1 further comprising at least on vertical divider in the chamber of the secondary vessel extending from the solid bottom of the secondary vessel.

6. A device as in claim 1 wherein the secondary wall further comprises a textured surface to improve the grip on the secondary vessel for rotating the secondary vessel.

* * * * *